US008225730B2

(12) United States Patent
Lo

(10) Patent No.: US 8,225,730 B2
(45) Date of Patent: Jul. 24, 2012

(54) METHOD OF MAKING A BALL GLOVE

(76) Inventor: Chuan-Hsin Lo, Hua-Lien Hsien (TW)

( * ) Notice: Subject to any disclaimer, the term of this patent is extended or adjusted under 35 U.S.C. 154(b) by 519 days.

(21) Appl. No.: 12/545,123

(22) Filed: Aug. 21, 2009

(65) Prior Publication Data

US 2011/0041744 A1 Feb. 24, 2011

(51) Int. Cl.
*D05B 23/00* (2006.01)
*A41D 19/00* (2006.01)
(52) U.S. Cl. ............................. 112/475.08; 2/164; 2/169
(58) Field of Classification Search ............. 112/16, 112/475.08, 152, 153; 264/232; 2/19, 159, 2/161.1–169; 425/522, 542; 223/57
See application file for complete search history.

(56) References Cited

U.S. PATENT DOCUMENTS

| | | | | |
|---|---|---|---|---|
| 3,903,546 A | * | 9/1975 | Rhee | 2/16 |
| 4,545,841 A | * | 10/1985 | Jackrel | 156/290 |
| 4,679,257 A | * | 7/1987 | Town | 2/164 |
| 4,921,672 A | * | 5/1990 | Bock | 264/161 |
| 5,867,830 A | * | 2/1999 | Chen | 2/161.1 |
| 6,308,331 B1 | * | 10/2001 | Robak | 2/19 |
| 6,353,931 B1 | * | 3/2002 | Gilligan et al. | 2/19 |
| 6,766,531 B2 | * | 7/2004 | Sullivano et al. | 2/19 |
| 2010/0154106 A1 | * | 6/2010 | Hammons et al. | 2/455 |

* cited by examiner

*Primary Examiner* — Ismael Izaguirre
(74) *Attorney, Agent, or Firm* — Yudell Isidore Ng Russell PLLC

(57) ABSTRACT

A method of making a ball glove includes molding a plastic material to form a single-piece front palm lining that has a palm lining portion and five front finger lining portions, forming a back lining that has five rear finger lining portions, stitching together the front palm lining and the back lining to form a glove lining that has five inner finger stalls, tailoring a front ply that has a palm cover portion and five front finger cover portions, molding a plastic material to form a single-piece back ply that has five rear finger cover portions, assembling the front ply and the back ply to form an outer shell, forming a web, and assembling the web, the outer shell, and the glove lining to form the ball glove.

4 Claims, 6 Drawing Sheets

METHOD OF MAKING A BALL GLOVE

BACKGROUND OF THE INVENTION

1. Field of the Invention

This invention relates to a method of making a glove, more particularly to a method of making a ball glove.

2. Description of the Related Art

Referring to FIGS. 1-3, a conventional method of making a baseball glove includes steps 11 to 14.

Referring to FIG. 1, a glove lining 21 is formed by virtue of step 11 that includes substeps 111 to 115. A front palm lining 211 is tailored in substep 111. A strengthening sheet 212 is stitched on the front palm lining 211 in substep 112 after substep 111. A plurality of rear finger lining portions 213 are tailored in substep 113. After substeps 112 and 113, the rear finger lining portions 213 and the front palm lining 211 are stitched together in substep 114. Three finger extension portions 214 made of felt and the front palm lining 211 are stitched together in substep 115 after substep 114, thereby forming the glove lining 21.

Referring to FIG. 2, an outer shell 22 is formed through step 12 that includes substeps 121 to 123. In substep 121, a front ply 221 is tailored, and has a palm cover portion 222 and five front finger cover portions 223 that extend outwardly from the palm cover portion 222. A plurality of outer finger portions 225 and a plurality of inner finger portions 224 are tailored in substep 122. In substep 123, the outer finger portions 225 and the inner finger portions 224 are stitched together so as to form a back ply 226 that has five rear finger cover portions 229.

Referring to FIG. 3, a web 23 is formed in step 13. The web 23, the glove lining 21, and the outer shell 22 are stitched together to form a baseball glove 2 via step 14 after steps 11 to 13. Step 14 includes substeps 141 to 143. In substep 141, the glove lining 21 is inserted into the outer shell 22 so that each of the three finger extension portions 214 is disposed between a respective one of the rear finger cover portions 229 and a respective one of the front finger cover potions 223 (see FIG. 2). In substep 142, a large finger felt pad 227 and a small finger felt pad 228 are respectively disposed between the outer shell 22 and the glove lining 21. As such, each of the large finger felt pad 227 and the small finger felt pad 228 has a portion thereof, which is placed between the respective rear finger cover portion 229 and the respective front finger cover portion 223. A lace 24 is used for connecting the web 23 to the outer shell 22 in substep 143, thereby forming the baseball glove 2.

However, some of the drawbacks of the conventional method are as follows:

1. The method includes many tailoring and stitching processes, and is hence complicated. A labor cost and a production cost of the baseball glove 2 are relatively high.

2. The baseball glove 2 has an unsatisfactory weight. Only when the weight of the baseball glove 2 is reduced, a user is able to easily manipulate the same.

3. The finger extension portions 214, the large finger felt pad 227, and the small finger felt pad 228 respectively have fixed standard thicknesses that are unable to be easily changed. Thus, the baseball glove 2 is not suitable for every user.

SUMMARY OF THE INVENTION

Therefore, the object of the present invention is to provide a method of making a ball glove that can overcome the aforesaid drawbacks of the prior art.

According to this invention, there is provided a method of making a ball glove. The method comprises: molding a plastic material to form a single-piece front palm lining that has a palm lining portion and five front finger lining portions; forming a back lining that has five rear finger lining portions; stitching together the front palm lining and the back lining to form a glove lining that has five inner finger stalls; tailoring a front ply that has a palm cover portion and five front finger cover portions; molding a plastic material to form a single-piece back ply that has five rear finger cover portions; assembling the front ply and the back ply to form an outer shell; forming a web; and assembling the web, the outer shell, and the glove lining to form the ball glove.

BRIEF DESCRIPTION OF THE DRAWINGS

Other features and advantages of the present invention will become apparent in the following detailed description of the preferred embodiment of this invention, with reference to the accompanying drawings, in which.

DETAILED DESCRIPTION OF THE PREFERRED EMBODIMENT

Figure 1:
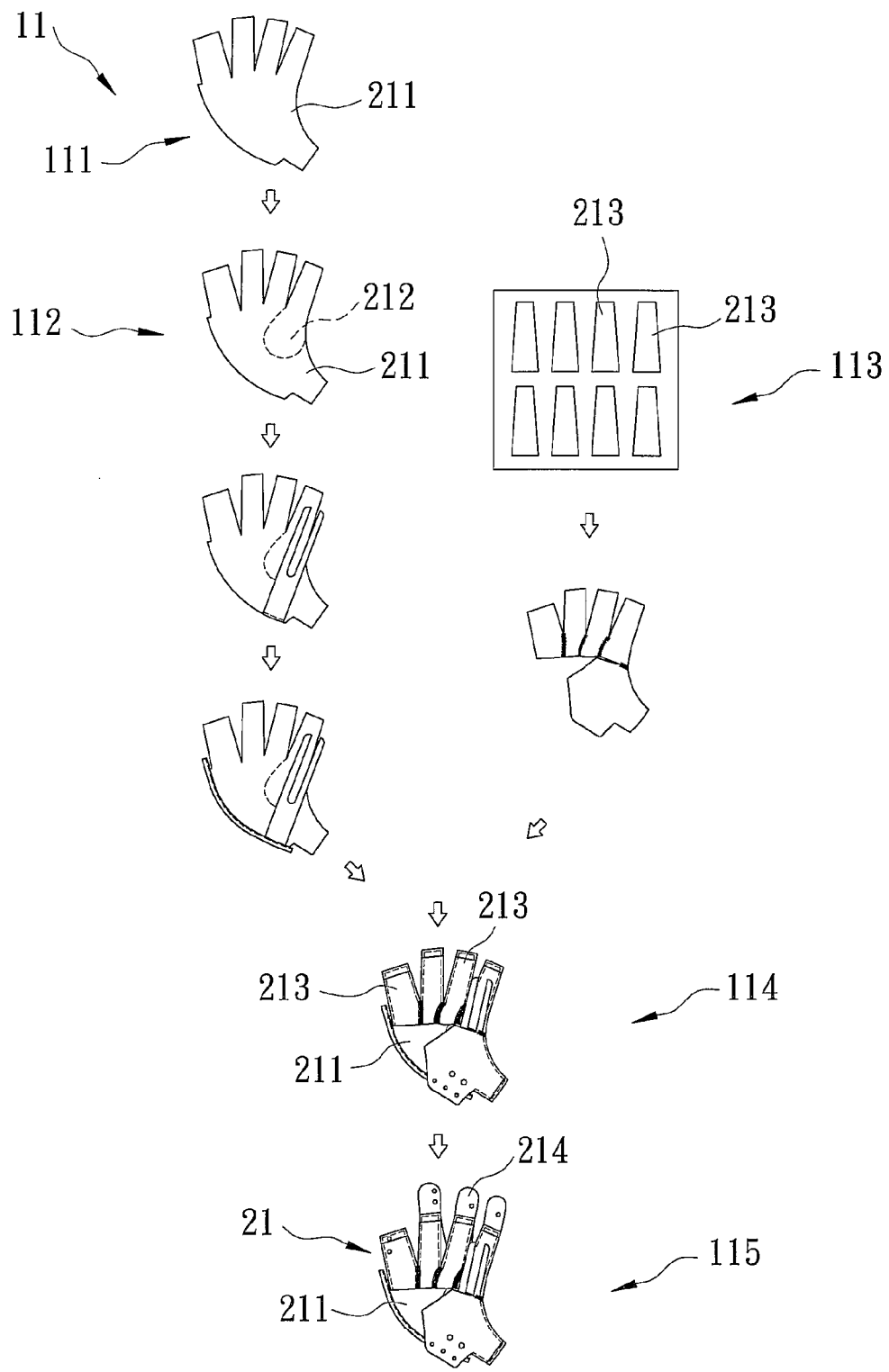
FIG. 1 is a schematic flow chart illustrating how a glove lining is formed through a conventional method of making a baseball glove.
Figure 2:
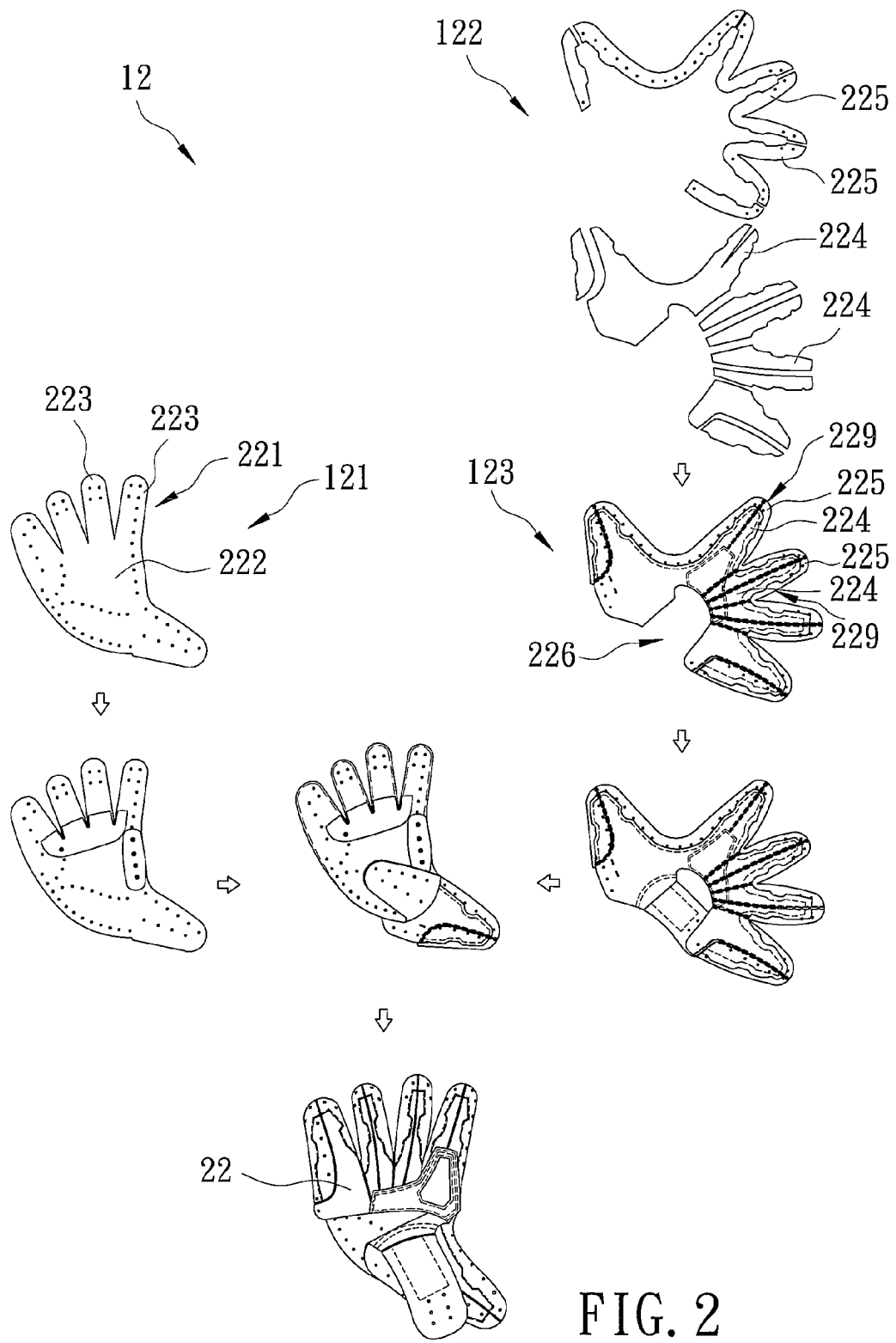
FIG. 2 is a schematic flow chart illustrating how an outer shell is formed though the conventional method of making the baseball glove.
Figure 3:
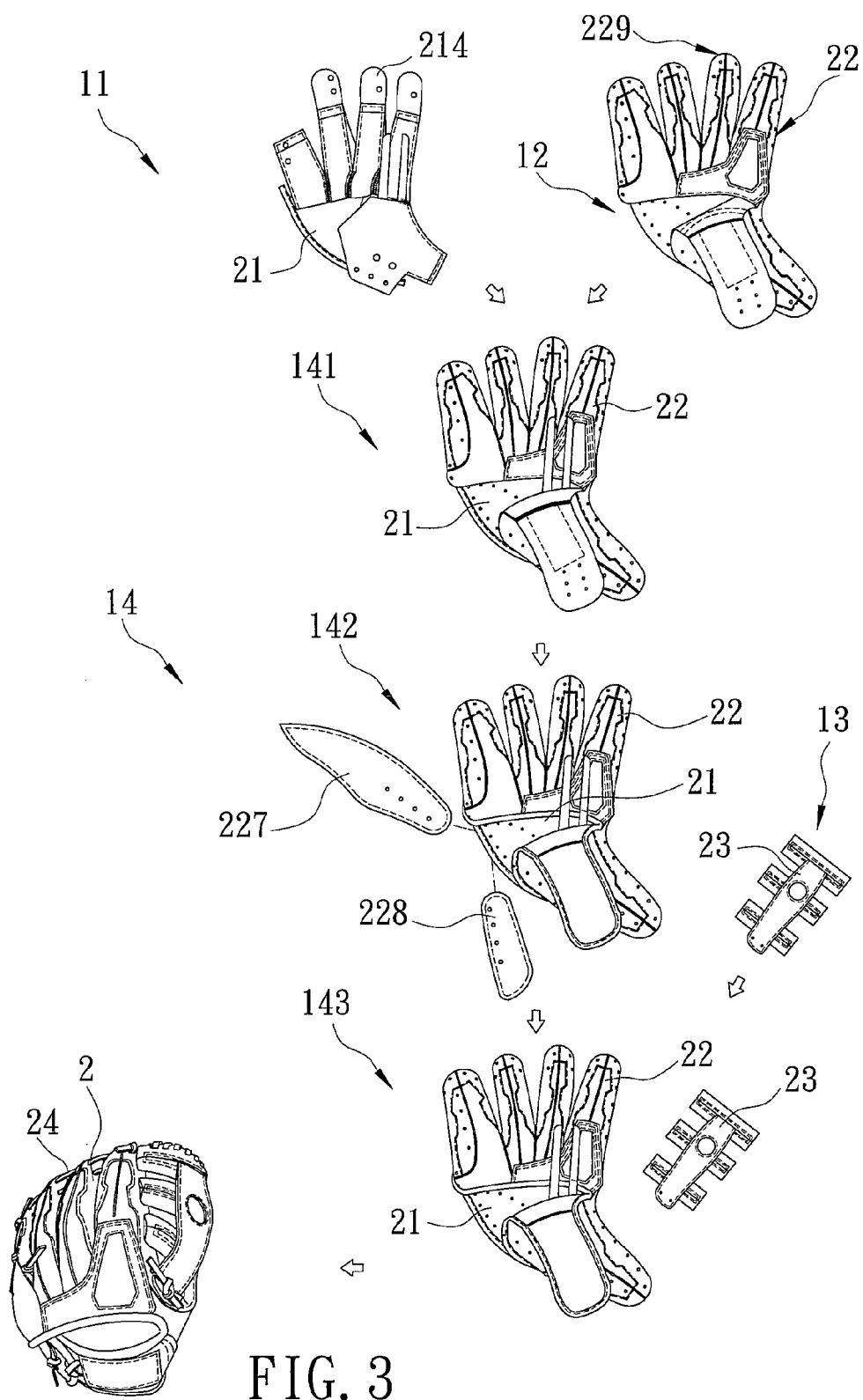
FIG. 3 is a schematic flow chart illustrating how the baseball glove is formed through the conventional method of making the baseball glove.
Figure 4:
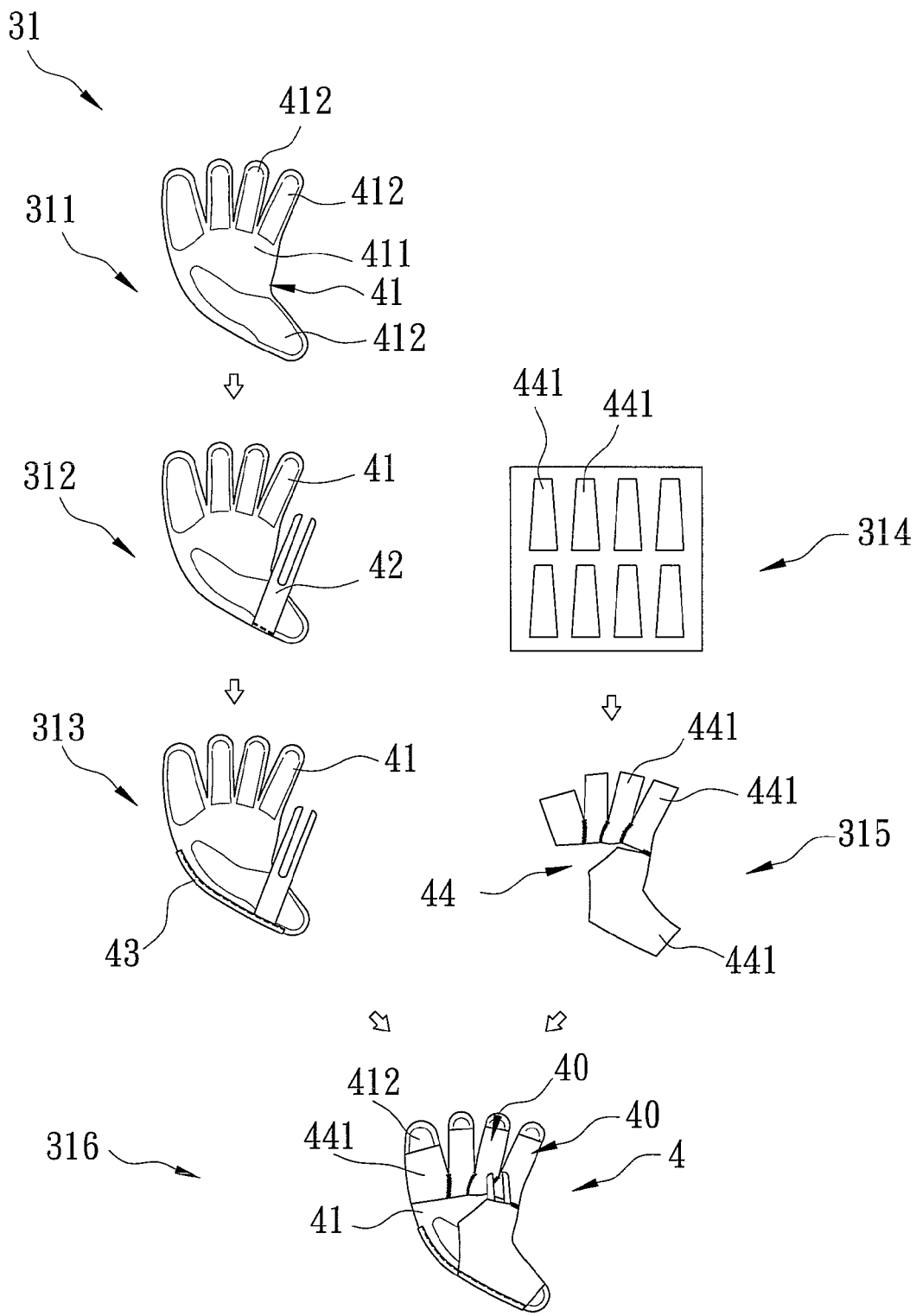
FIG. 4 is a schematic flow chart illustrating how a glove lining is formed according to the preferred embodiment of this invention.
Figure 5:
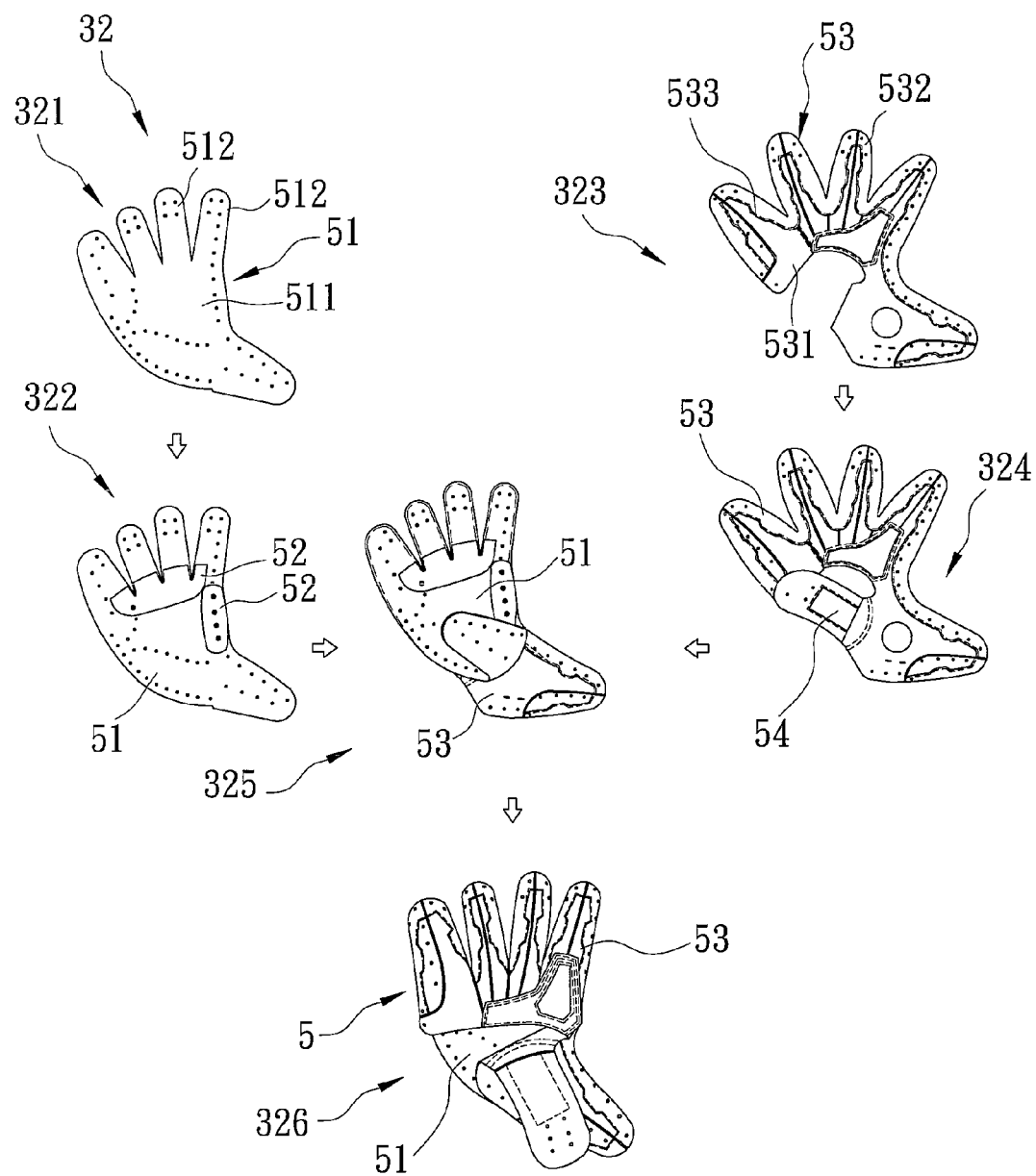
FIG. 5 is a schematic flow chart illustrating how an outer shell is formed according to the preferred embodiment.
Figure 6:
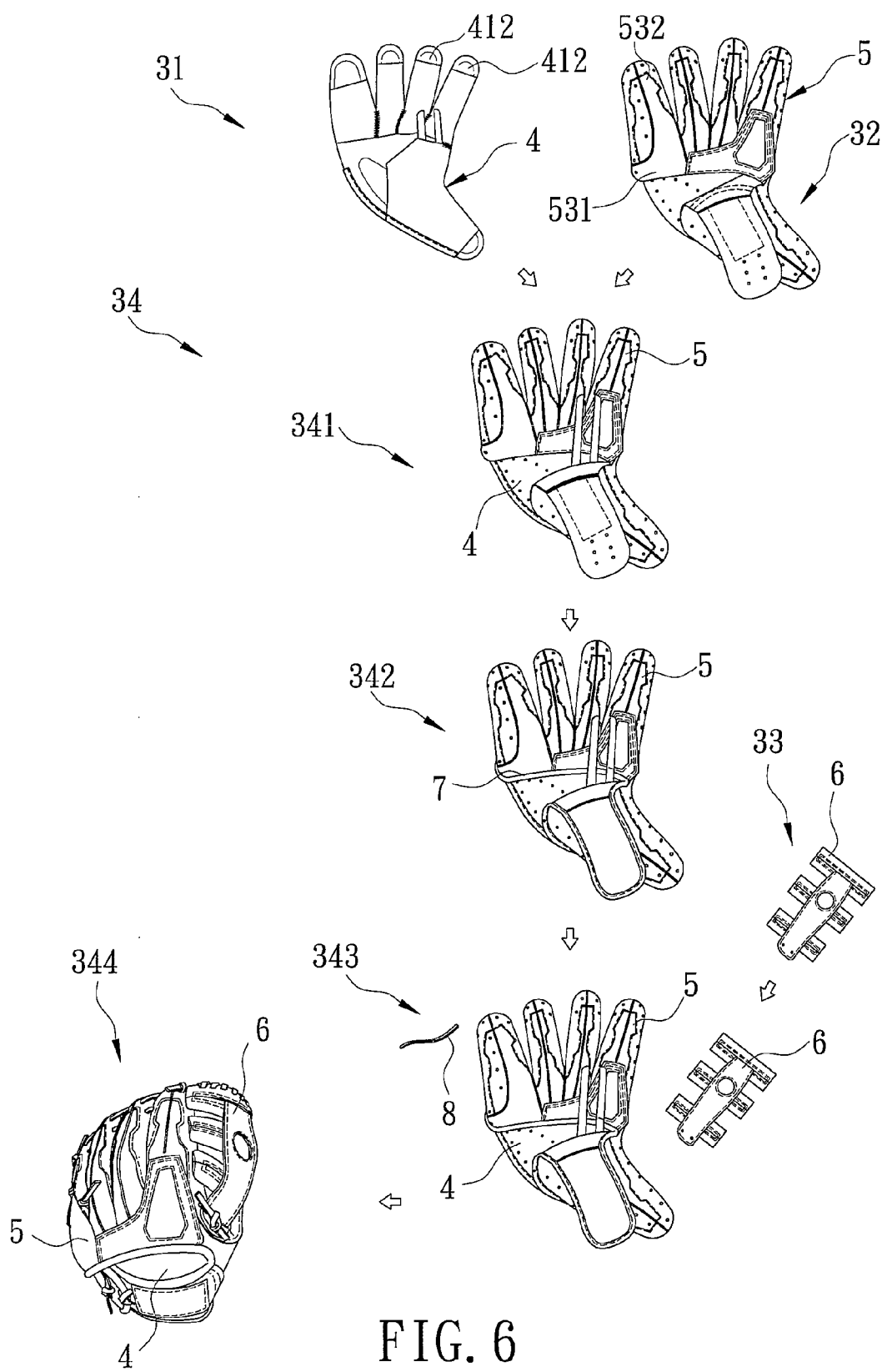
FIG. 6 is a schematic flow chart illustrating how a baseball glove is formed according to the preferred embodiment.

Referring to FIGS. 4-6, according to the present invention, the preferred embodiment of a method of making a ball glove, such as a baseball glove, includes steps 31 to 34.

A glove lining 4 is formed by means of step 31 that includes substeps 311 to 316 as shown in FIG. 4. In substep 311, a plastic material is molded to form a single-piece front palm lining 41 that has a palm lining portion 411, and five front finger lining portions 412 extending from the palm lining portion 411. The plastic material used for forming the front palm lining 41 is a material selected from the group consisting of ethylene vinyl acetate (EVA) copolymer, thermoplastic elastomer (TPE), and polyurethane (PU) foams. After substep 311, a triangular strap 42 is stitched to the front palm lining 41 in substep 312. A hem 43 is stitched on an edge of the front palm lining 41 opposite to the front finger lining portions 412 in substep 313 after substep 312. A plurality of rear finger lining portions 441 are tailored in substep 314. Five of the rear finger lining portions 441 are stitched together so as to form a back lining 44 in substep 315. After substeps 313 and 315, the front palm lining 41 and the back lining 44 are stitched together to form the glove lining 4 that has five inner finger stalls 40 in substep 316. Each front finger lining portion 412 is longer than the respective rear finger lining portion 441.

Referring to FIG. 5, an outer shell 5 is formed via step 32 that includes substeps 321 to 326. A front ply 51 is tailored in substep 321. The front ply 51 has a palm cover portion 511 and five front finger cover portions 512 that extend from the palm cover portion 511. After substep 321, two palm pads 52 are attached to the front ply 51 in substep 322. A plastic material is molded to form a single-piece back ply 53 in substep 323. The plastic material for forming the back ply 53 is a material selected from the group consisting of EVA copolymer, TPE, and PU foams. The back ply 53 is formed with a plurality of stitch-like embossed patterns 533, and has a palm portion 531 and five rear finger cover portions 532. The palm portion 531 is hollow at a center thereof. After substep 323, a flap 54 is stitched to the back ply 53 in substep 324. After substeps 324 and 322, the front and back plies 51,53 are stitched together in substep 325. The front and back plies 51,53 are turned inside out and ironed so as to form the outer shell 5 in substep 326 after substep 325.

Referring to FIG. 6, a web 6 is formed in step 33. The baseball glove is formed by virtue of step 34 that is performed after steps 31, 32, and 33, and that includes sequential substeps 341 to 344. In substep 341, the glove lining 4 is inserted into the outer shell 5 with each of the inner finger stalls 40 being placed between a respective one of the front finger cover potions 512 (see FIG. 6) and a respective one of the rear finger cover portions 532. In substep 342, a hem 7 is stitched on the outer shell 5 to cover a hairy end of the same. In substep 343, the web 6 is stitched to the outer shell 5, and a lace 8 is stitched to the glove lining 4, the outer shell 5, and the web 6. In substep 344, the web 6, the outer shell 5, and the glove lining 4 are reformed and packaged, thereby forming the baseball glove.

Some of the advantages of the method according to the present invention are as follows:

1. Since the front palm lining 41 and the back ply 53 are respectively formed as a single piece by molding, conventional substeps 112, 115, 122, 123, and 142 are not required. Namely, the laborious tailoring and stitching steps are reduced, thereby lowering a labor cost and a production cost of the baseball glove. Distances between cutting dies used for tailoring may lead to waste of materials. Due to less tailoring steps used in the invention, a smaller amount of materials is wasted.

2. The baseball glove made using EVA copolymer, TPE, or PU foams has a weight less than that of the conventional baseball glove 2. Therefore, a user is capable of easily manipulating the baseball glove formed via the method of this invention.

3. Since the front palm lining 41 is formed by molding, a desired thickness of the front finger lining portions 412 can be obtained easily by molding. Consequently, the method can be performed so as to customize a baseball glove suitable for a user.

4. Because essential stitches are still provided in some parts of the ball glove, and because the stitch-like embossed patterns 533 are provided for the back ply 53, physical appearance and texture of the baseball glove made by the method of this invention are similar to those of the conventional baseball glove 2.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. A method of making a ball glove, comprising:
molding a plastic material to form a single-piece front palm lining that has a palm lining portion and five front finger lining portions;
forming a back lining that has five rear finger lining portions;
stitching together the front palm lining and the back lining to form a glove lining that has five inner finger stalls;
tailoring a front ply that has a palm cover portion and five front finger cover portions;
molding a plastic material to form a single-piece back ply that has five rear finger cover portions;
assembling the front ply and the back ply to form an outer shell;
forming a web; and
assembling the web, the outer shell, and the glove lining to form the ball glove.

2. The method of claim 1, wherein the plastic material to form each of the front palm lining and the back ply is a material selected from the group consisting of ethylene vinyl acetate copolymer, thermoplastic elastomer, and polyurethane foams.

3. The method of claim 1, wherein the back ply is formed with a plurality of stitch-like embossed patterns.

4. The method of claim 1, wherein the assembling of the web, the outer shell, and the glove lining includes the steps of: inserting the glove lining into the outer shell with each of the inner finger stalls being placed between a respective one of the front finger cover portions and a respective one of the rear finger cover portions; and stitching the web to the outer shell.

\* \* \* \* \*